United States Patent Office 3,474,762
Patented Oct. 28, 1969

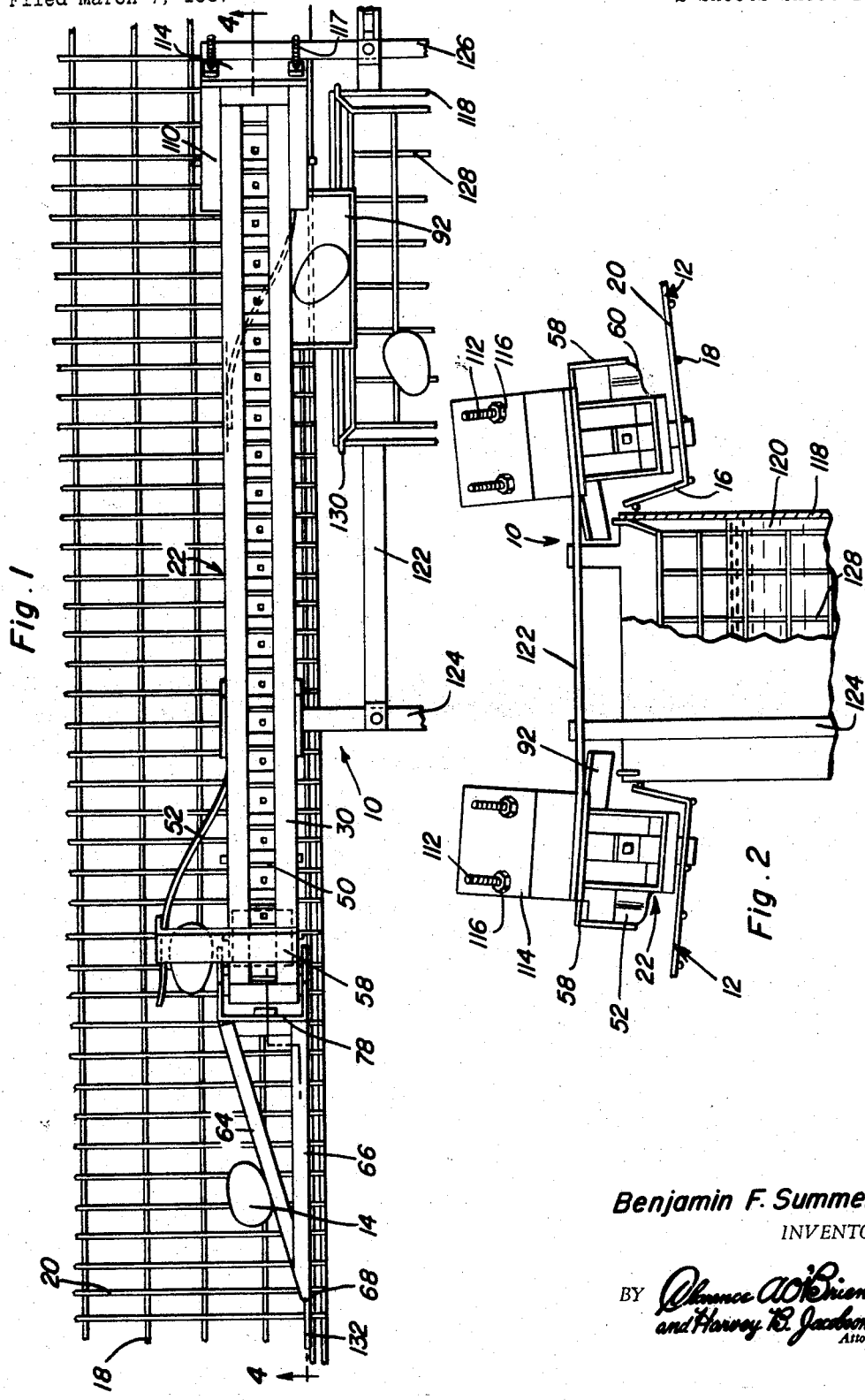

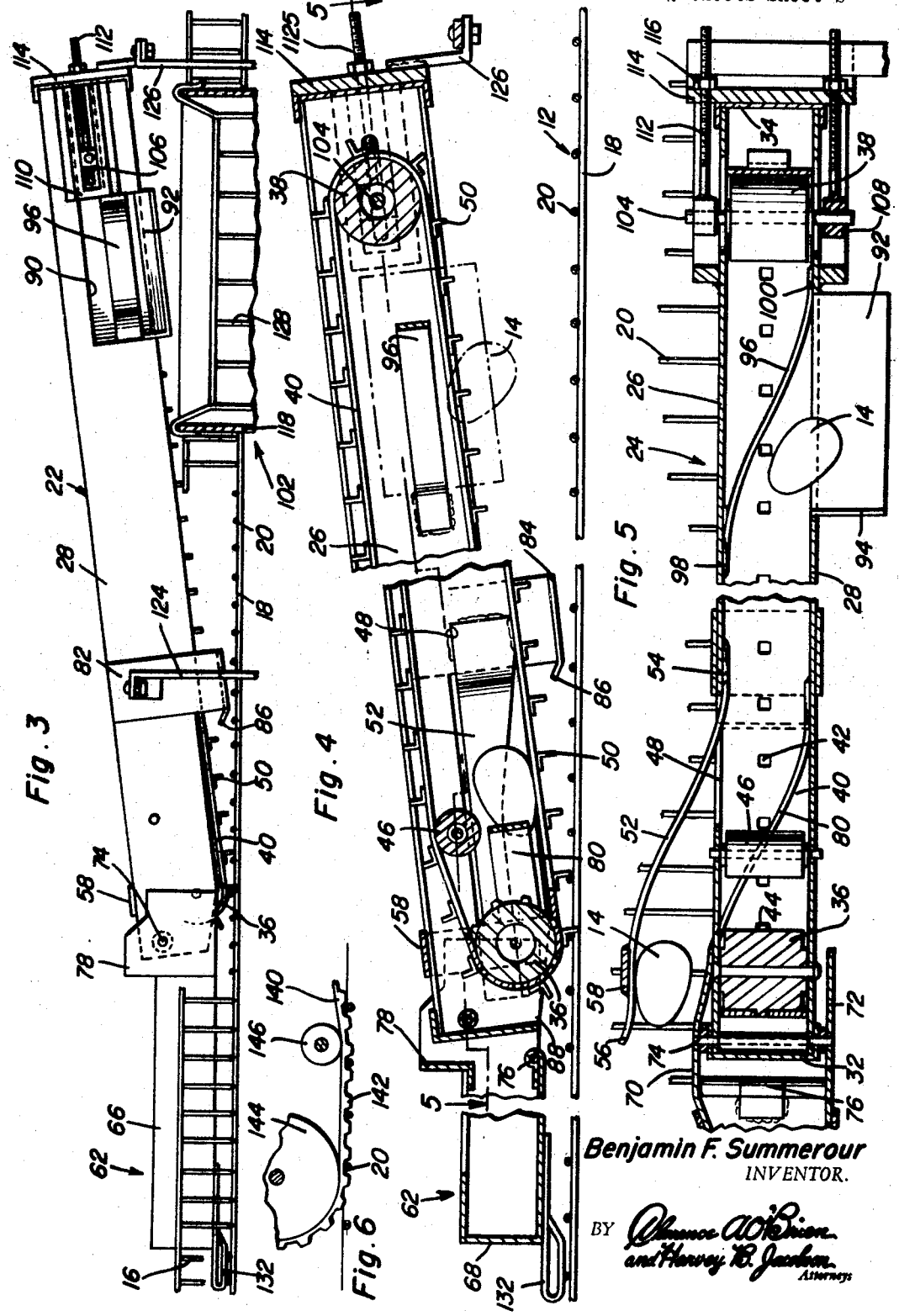

3,474,762
EGG GATHERING DEVICE WITH CONVEYOR
Benjamin F. Summerour, 237 N. Peachtree St.,
Norcross, Ga. 30071
Filed Mar. 7, 1967, Ser. No. 621,291
Int. Cl. A01k 31/14
U.S. Cl. 119—48                8 Claims

ABSTRACT OF THE DISCLOSURE

An egg gathering device for gathering eggs from the egg trays of a plurality of aligned laying cages having an inclined retaining tray for the eggs including a movable device in the form of a conveyor which gathers the eggs at the lower forward end thereof disposed within tray, then elevates the eggs and discharges them laterally outwardly of the tray into a receptacle filled with water to enable the eggs to be rolled or placed into the water without breakage.

---

An object of the present invention is to provide an egg gathering device for use with a battery of cages and the structure disclosed in this application includes certain novel improvements over that structure disclosed in copending application Ser. No. 518,962, filed Jan. 5, 1966 for Egg Gathering Device.

As is well known in the egg producing industry, a battery or row of laying cages are supported in an elevated position with each cage providing a compartment in which the hens lay the eggs. The floor of the cage is normally inclined sufficiently to cause the eggs to roll out onto a collection shelf or tray which has an upwardly extending retaining flange or wall so that the eggs may be gathered. This type of construction is disclosed in my prior Patent No. 3,158,137 issued Nov. 24, 1964.

While some devices have been developed for collecting eggs from the nest or cages with some degree of success, it is an object of the present invention to provide such an egg gathering device which may be moved along the egg retaining tray or shelf and elevate the eggs over top of the retaining flange or ledge and then deposit them into a receptacle having water therein of a depth to enable the eggs to be rolled into the water without breakage and subsequently slowly sink to the bottom of the receptacle without damage or breakage to the eggs.

Another object of the present invention is to provide an egg gathering device having an endless type of belt conveyor which is driven from the wire forming the continuous egg receiving tray forming a part of a battery or array of laying cages so that when the egg is gathered onto the conveyor, the egg will move in relation to the conveyor, inasmuch as the conveyor is driven in response to its movement over the wire tray, the egg will not be moved longitudinally in relation to the wire egg retaining tray but will be elevated in relation thereto a distance sufficient for it to be discharged laterally over the top edge of the retaining flange or ledge.

Another object of the present invention is to provide an egg gathering device having a conveyor in accordance with the preceding object together with a forwardly extending deflector assembly attached to the forward end of the conveyor for guiding eggs into the conveyor with the deflector assembly being freely pivotal about a substantially horizontal axis to enable the deflector assembly to move vertically to follow variations in contour of the egg supporting tray.

Still another important object of the present invention is to provide an egg gathering device which may be mounted on any suitable machine or supporting framework including a manually operable supporting cart or the like thereby enabling the egg gathering device to be rather inexpensively constructed but yet capable of gathering eggs in an efficient manner without breakage and enabling an automatic egg gathering operation or a semiautomatic gathering operation in which an attendant moves the egg gathering device in relation to the battery of laying cages.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a continuous egg gathering tray forming part of a battery of laying cages;

FIGURE 2 illustrates an end view of the egg gathering device of the present invention illustrating the association of the conveyor with two adjacent but spaced egg retaining trays;

FIGURE 3 is a side elevational view of one of the conveyors illustrating the association thereof with the egg receiving receptacle;

FIGURE 4 is a longitudinal, vertical sectional view taken substantially upon a plane passing along section line 4—4 of FIGURE 1 illustrating the structural details of the egg gathering device and its association with the egg retaining tray;

FIGURE 5 is a longitudinal, plan sectional view taken substantially upon a plane passing along section line 5—5 of FIGURE 4 illustrating further structural details of the egg gathering device; and FIGURE 6 is a fragmental view of a different type of belt for conveying eggs.

Referring now specifically to the drawings, the numeral 10 generally designates the egg gathering device of the present invention which is associated with a plurality of egg laying cages which are conventional in construction and provided with a downwardly inclined wire mesh bottom 12 which is a continuous member and forms an egg receiving tray for receiving and retaining eggs 14 thereon with the downward inclination of the wire mesh tray 12 serving to cause the eggs 14 to roll downwardly and away from the cages due to gravity until the eggs come to rest against an upwardly extending wire mesh flange 16. Due to the rolling movement of the eggs, the eggs 14 will normally rest in the corner juncture between the bottom wire mesh structure 12 and the flange 16 with the longitudinal axis of the egg paralleling the flange 16. As is well known, the wire mesh structure forming the bottom 12 is continuous and is formed by a plurality of longitudinal wire members 18 and a plurality of transverse wire members 20 which are disposed in perpendicular intersecting relation to each other thus forming a wire mesh. As illustrated in FIGURE 2, the egg gathering device 10 of the present invention may be employed between two parallel wire cage assemblies with the egg gathering device being moved longitudinally between the upwardly extending flanges or ledges 16 by virtue of having the egg handling device mounted on any suitable type of mobile machine such as that disclosed in Patent No. 3,158,137 or on a manually movable wheeled cart or the like. The supporting structure for the egg gathering device has not been illustrated inasmuch as it forms no particular part of the invention and may either support the egg gathering device from a floor surface or from an overhead track or the like.

The egg gathering device includes a pair of conveyor structures disposed in parallel relation and each conveyor 22 includes a hollow housing generally designated by numeral 24. The housing includes side panels 26 and 28 which are longitudinally elongated and are disposed in spaced parallel relation with the upper and lower edges thereof being provided with inturned flanges 30. The ends of the plates 26 and 28 are interconnected by end plates 32 and 34. Journalled between the end portions of the plates 26 and 28 are end rollers 36 and 38 which have an endless flexible belt 40 entrained therearound. The belt 40 is constructed of flexible material conventionally employed in conveyor belts and is provided with a plurality of longitudinally spaced openings 42 disposed centrally therein which are engaged by a plurality of circumferentially spaced projections 44 on the roller 36 thus drivingly interconnecting the roller 36 and the conveyor belt 40. An idler roller 46 is provided between the plates 26 and 28 adjacent the roller 36 with the upper surface of the idler roller 46 being above the upper surface of the roller 36 to elevate that portion of the conveyor belt 40 adjacent the roller 36 thereby elevating the belt away from the top edge of an elongated slot-like entrance opening 48 formed in the wall 26 adjacent to but rearwardly of the roller 36.

The inner surface of the conveyor belt 40 is smooth but the outer surface thereof is provided with a plurality of longitudinally spaced lugs 50 extending perpendicularly therefrom. The lugs 50 are formed in the shape of L-shaped members attached to the belt 40 in any suitable manner such as by riveting or the like and the length of each lug 50 is less than the width of the belt and less than the distance between the flanges 30 so that the lugs or projections 50 will interengage with the transversely extending spaced wires 20 of the egg tray 12 thereby serving to drive the conveyor belt 40 in response to movement of the conveyor 22 along the egg tray 12 when the lugs 50 are engaged with the wires 20.

For guiding eggs 14 into the entrance opening 48, the housing 24 is provided with a forwardly extending and longitudinally curved guide strip 52 which has the rearmost end thereof extending into the opening 48 at the rear edge thereof and secured to the inner surface of the plate 26 as at 54. The forward portion of the guide strip 52 is disposed in spaced parallel relation to the forward end portion of the plate 26 and is flared or curved outwardly as at 56 thus forming a generally curved entrance guide strip 52 for the egg 14 so that it will be guided through the opening 48 during forward movement of the conveyor 22 while the egg 14 is relatively stationary in relation to the transverse wire members 20. A laterally extending strap-like bracket 58 is attached to the housing 24 and extends laterally and downwardly into contacting and connecting relationship to the outer surface of the guide strip 52 adjacent the outwardly flared end 56 thereof to provide a support for the guide strip 52 which is relatively narrow in relation to the depth of the housing 24 with the bottom edge of guide strip 52 also flaring upwardly as at 60 to more effectively engage the eggs and guide them laterally inwardly toward the opening 48.

Extending forwardly of the conveyor housing 24 is a deflector assembly 62 in the general form of a hollow tapering housing having converging wall surfaces 64 and 66 joined together in a narrow vertical forward edge 68. The surface 66 is generally parallel to and in alignment with the plate 28 so that it will move along the inner surface of the flange 16 while the surface 64 diverges rearwardly therefrom and merges with a guide plate 70 which curves inwardly in spaced relation to the guide strip 52 and terminates rearwardly of the forward edge of the guide strip 52 as illustrated in FIGURE 5. The rear edge of the wall 66 is also connected with a rearwardly extending mounting plate or strip 72 which extends alongside of the wall 28 and a pivot pin or bolt 74 extends through the plate 72 and the plate 70 and through the housing 24 as well as flanges on the end cap 32 thus pivotally attaching the deflector assembly 62 to the forward end of the housing 24 for pivotal movement about the horizontal axis defined by the pivot pin or bolt 74. The pivot pin or bolt 74 is located adjacent the upper end of the housing 24 and the lower portion of the deflector assembly is provided with a stop member 76 extending transversely thereof for engagement with the front surface of the lower edge portion of the end plate 32 thus limiting the downward swinging movement of the deflector assembly 62 to a position generally in alignment with the longitudinal axis of the housing 24 but enabling the housing 24 to swing upwardly in relation to the deflector assembly 62 which is gravitationally urged downwardly into engagement with the egg tray 12. The rear of the hollow housing forming the deflector assembly 62 is provided with an upwardly extending plate 78 which extends transversely of the plates 70 and 72 and may be integral therewith. The plates 70 and 72 are illustrated as separate elements from the members 64 and 66 but these elements could all be constructed of one-piece. The upstanding plate 78 will limit the relative pivotal movement of the deflector assembly 62 in relation to the housing 24 when it engages the transversely extending mounting strap 58. Also, a laterally curved guide strip 80 is provided from the forward edge of the opening 48 and extends rearwardly and transversely across the inner surface of the lower run of the conveyor belt 40 as illustrated in FIGURE 5 to further guide the eggs 14 in relation to the housing 24 and conveyor belt 40.

A supporting strap 82 is provided on the housing 24 just rearwardly of the opening 48 and is generally U-shaped in construction with the lower bight portion thereof 84 being spaced below the lugs 50 and including an upturned forwardly projecting end 86 to provide further support for the conveyor in the event of changes in the elevational relationship between the tray 12 and the supporting carrier or cart for the egg carrying device thereby serving to assure that the cutaway lower forward corner 88 of the housing will provide for positive driving interengagement between the lugs 50 and the transverse wires 20.

Adjacent the rear elevated end of housing 24, the plate 28 is provided with an elongated and enlarged egg discharge opening 90 which extends to the bottom edge of the plate or wall 28 and the lower edge of the opening 90 has a laterally extending and outwardly and downwardly inclined chute 92 connected thereto and which may be integral therewith. The chute may be in the form of a panel formed by the material struck out from the side plate to form the opening 90 with the end edges thereof being parallel to each other and inasmuch as the forward end will normally be slightly below the rearward end, it is preferably provided with an upturned edge 94. As illustrated in FIGURES 3 and 4, the upper surface of the lower run of the conveyor belt 40 will be generally aligned with the bottom edge of the discharge opening 90 and the chute 92 which forms a continuation thereof. A laterally extending and generally curved guide strip 96 extends from the inner surface of the wall 26 where it is attached by any suitable means as at 98 laterally of the housing 24 for merging with the rear edge of the opening 90 where it is attached as at 100 thus serving as a guide and deflector for urging eggs 14 laterally of the conveyor belt and out through the opening 90 so that they will roll by gravity down the chute 92 for depositing into an egg receiving receptacle generally designated by numeral 102.

The rearmost roller is mounted on a shaft 104 which extends out through longitudinal slots 106 in the walls or plates 26 and 28 and is received in slidable bearing blocks 108 received in guide ways 110. Each guide block 108 is provided with a threaded bolt 112 extending through a transversely extending plate or bracket 114 engaged with the end plate 34 and provided with a nut 116 by which the roller 38 can be moved longitudinally outwardly or permitted to move longitudinally inwardly thus tightening and loosening the conveyor belt 40 so that it will be retained in the proper tension between the rollers 36 and 38.

The egg receiving receptacle is in the form of a liquid containing receptacle 118 containing a quantity of water 120 and the receptacle 118 is supported by a plurality of brackets 122 which are connected to laterally extending forward brackets 124 and rear brackets 126. The forward brackets 124 are connected to the bracket straps 82 while the rear brackets 126 are connected to the plate 114 in any suitable manner thus interconnecting the receptacle 118 and the conveyors 22 in a fixed position. Thus, by supporting the receptacle 118 on a suitable cart or carrier, the conveyors 22 are correspondingly supported.

Disposed within the receptacle 118 is a wire mesh basket 128 of conventional construction having hook-like members 130 detachably engaging the top edge of the receptacle and provided with suitable conventional handles to enable the basket 128 to be lifted out of the receptacle 118 and to be replaced with an empty basket 128 to enable the eggs to be removed from the receptacle 118.

As illustrated, the water 120 substantially completely fills the receptacle 118 especially after some eggs have been discharged therein so that a relatively large quantity of eggs may be deposited into the basket 128 before it is necessary to remove the basket and the eggs therein. The eggs when they are rolled into the water 120 will sink rather slowly from the top surface of the water to the bottom of the basket or into engagement with eggs which have already come to rest on the bottom of the basket. A relatively small depth of water is sufficient to slow the vertical movement of the egg to a safe velocity so that the egg will not be broken when it engages the bottom of the basket or eggs already on the bottom of the basket.

Projecting forwardly from the deflector assembly and secured to the undersurface thereof is a guide wire 132 in the form of a relatively flat loop forming a continuation of the inner wall of the deflector assembly to further guide the eggs 14 so that they will move away from the ledge or flange 16 and be deflected laterally for movement into the conveyor 22.

In operation, the conveyors 22 are engaged with the egg trays 12 at one end thereof and proper adjustments may be provided to enable the conveyor 22 to be orientated generally in the manner illustrated in the drawings. Thereafter, the movement of the conveyors longitudinally of the egg tray will cause the conveyor belt 40 to be driven by the driving engagement between the lug 50 and the transverse wires 20 forming part of the egg tray 12. In view of the space between the compartments of the laying cages, the eggs 14 will be spaced longitudinally along the egg tray in relation to each other and this spatial relationship will be maintained. As an egg 14 is engaged by the tip end 132 on the deflector assembly 62, it will be urged laterally inwardly and will not tend to roll longitudinally of the egg tray since it normally will be disposed with the long axis thereof parallel to the flange 16. Thus, while the egg will roll laterally inwardly away from the flange 16, it will slide along the inner surface of the deflector assembly and enter the space between the guide strip 80 and 52 and then enter the hole 48 and be guided by the strip 80 onto the upper surface of the lower run of the conveyor belt 40. Actually, the egg has not moved longitudinally in relation to the egg tray 12 but the conveyor 22 has moved in relation to the egg tray 12 and the egg 14. Then as the conveyor 22 continues to move, the longitudinal movement of the lower run of the conveyor belt 40 will move the egg rearwardly in relation to the conveyor but since the lower run of the conveyor is moving rearwardly at the same speed that the conveyor is moving forwardly in relation to the egg tray, the egg 14 will still remain stationary insofar as relative longitudinal movement along the egg tray is concerned. Then as the egg 14 approaches the rear end of the conveyor 22, the guide strip 96 will deflect the egg 14 laterally outwardly over the ledge 16 and into the egg receiving assembly 102. Thus, insofar as relative longitudinal movement between the egg 14 and the egg tray 12 is concerned, there is none but the egg does move laterally inwardly and then laterally outwardly and also upwardly over the ledge 16. Since the eggs retain the same longitudinal relationship with the egg tray 12 they of course, will retain their same spaced relationship thus assuring that an egg rolled into the water will settle to the bottom of the water in the receptacle before a subsequent egg is deposited into the water in the receptable 118.

FIGURE 6 illustrates a slightly different embodiment of belt 140 in the form of a timing belt having longitudinally spaced integral lugs 142 on the exterior surface thereof. The belt 140 is entrained over end pulleys or rollers 144 and an idler pulley or roller 146 to retain a length of the belt 140 straight for positive driving engagement with the transverse wire rod 20 on the egg tray 12.

The egg gathering device of the present invention operates basically on the principle of the conveyor belt being geared to the egg tray or nest thereby eliminating longitudinal movement of the eggs so that each egg is at rest with reference to the egg tray or nest while it is being moved slightly transversely and placed on the conveyor belt. Under this system of relocation of each egg on the conveyor belt, they will maintain their same clearance between each individual egg thus eliminating any possible breaking thereof. Inasmuch as the conveyor, as a unit, is moving longitudinally, the eggs at the point of delivery into a water filled container will continue to be separated as they were when placed on the conveyor belt.

While the device has been illustrated as combined with cage batteries or cage operations, it is also adaptable for use on floor-type operations with roll-out nests for eggs with frictionally driving engagement of the conveyor belt with a stationary egg tray surface. The conveyor structure may be inclined in any suitable manner to receive the inclined upwardly extending flange or abutment on the egg tray and the belt will lie flat against the egg tray. Also, other types of mechanisms may be provided for receiving the eggs from the conveying device such as second conveyors or the like. However, the water in the receptacle may serve as a washing operation or at least an initial washing operation so that subsequent washing operations with existing egg washing machinery will be more efficient inasmuch as any dirt or other foreign matter on the egg shell will be at least partially loosened while the egg is submerged in the water in the receptacle 118.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An egg gathering device for use in combination with an egg tray having an inclined bottom and an upwardly extending retaining flange at the lower edge thereof comprising means movable longitudinally of the egg tray for elevating spaced eggs thereon over the egg retaining flange and discharging eggs laterally outwardly of the egg tray, said means including a longitudinally moving conveyor member movable rearwardly at a speed substantially equal to the forward movement of said means thereby retaining the egg and egg tray in stationary relation insofar as relative longitudinal movement between the egg and tray is concerned a first guide means for directing an egg onto said conveyor member and a second guide means for directing an egg off the conveyor member into an egg receiving means.

2. An egg gathering device for use in combination with an egg tray having an inclined bottom and an upwardly extending retaining flange at the lower edge thereof comprising means movable longitudinally of the egg tray for elevating spaced eggs thereon over the egg retaining flange and discharging eggs laterally outwardly of the egg tray, said means being constructed to retain the egg and egg tray in stationary relation insofar as relative longitudinally movement of the egg along the tray is concerned, said means being in the form of a conveyor movable along the upper surface of the egg tray adjacent the inner surface of the retaining flange thereon, means on said conveyor for engaging eggs on the egg tray and guiding them onto the conveyor, and means on said conveyor for conveying eggs rearwardly in relation thereto at the same speed as the conveyor moves in relation to the egg tray thus leaving the egg in stationary relation to the egg tray insofar as longitudinal relative movement is concerned, and means at the opposite end of the conveyor from the end thereof which initially approaches an egg to laterally discharge an egg therefrom, said conveyor being disposed in inwardly inclined relation to the egg tray for elevating the egg to a point above the retaining flange for discharging the egg laterally of the top thereof.

3. The structure as defined in claim 2 wherein said egg tray is constructed of wire mesh, said means on the conveyor receiving said egg including an endless belt, end rollers supporting said belt, said belt having longitudinally spaced projections on the exterior surface thereof for driving engagement with the wire mesh of the egg tray thereby moving the conveyor belt at the same speed as the conveyor moves.

4. The structure as defined in claim 3 wherein said means for guiding eggs onto the conveyor includes a forwardly extending tapered deflector assembly having one wall thereof parallel to and adjacent the inner surface of the retaining flange on the egg tray and the other wall diverging rearwardly therefrom, the rearwardly diverging wall terminating in a guide surface along the inner side of the conveyor, a guide member spaced from the guide surface and receiving eggs from the inclined surface of the deflector assembly and guiding the eggs onto the upper surface of the lower run of the conveyor belt.

5. The structure as defined in claim 4 wherein said means for discharging the egg from the conveyor belt includes a guide strap moving the egg laterally in relation to the belt as the belt approaches the rear end of the conveyor, and a downwardly inclined chute forming the bottom of a discharge opening for the eggs for discharging the eggs laterally of the conveyor and over top of the retaining flange.

6. The structure as defined in claim 5 together with means associated with the chute for receiving eggs therefrom, said means being in the form of a receptacle having a quantity of water therein, said receptacle and the quantity of water therein being relatively deep for receiving a plurality of eggs therein whereby the water into which the eggs are placed will floatingly support the eggs while they sink slowly to the bottom of the water in the receptacle.

7. The structure as defined in claim 5 wherein said deflector assembly is pivotally connected to the forward end of the conveyor for enabling variation in the angulation of the conveyor in relation to the deflector assembly thereby enabling the egg gathering device to be employed with egg trays having flanges of different heights.

8. The structure as defined in claim 1 wherein said egg receiving means includes, a receptacle, a quantity of liquid in said receptacle for receiving eggs, said liquid being of a depth sufficient to receive a plurality of layers of eggs thereby enabling eggs to be placed into the liquid where they will slowly sink thereby preventing breakage of the eggs.

References Cited

UNITED STATES PATENTS

| | | |
|---|---|---|
| 762,562 | 6/1904 | Strickler. |
| 2,966,884 | 1/1961 | Naraghi _____ 119—22 |
| 3,139,859 | 7/1964 | Naraghi _____ 119—48 |

HUGH R. CHAMBLEE, Primary Examiner